United States Patent
Zhang et al.

(10) Patent No.: US 8,566,160 B2
(45) Date of Patent: Oct. 22, 2013

(54) DETERMINING PLACEMENT OF ADVERTISEMENTS ON WEB PAGES

(75) Inventors: Bo B. Zhang, Beijing (CN); Fengping Zeng, Beijing (CN); Siyu You, Beijing (CN)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/499,561

(22) PCT Filed: Sep. 30, 2010

(86) PCT No.: PCT/CN2010/001538
§ 371 (c)(1),
(2), (4) Date: Mar. 30, 2012

(87) PCT Pub. No.: WO2012/040881
PCT Pub. Date: Apr. 5, 2012

(65) Prior Publication Data
US 2012/0259702 A1    Oct. 11, 2012

(51) Int. Cl.
*G06Q 30/00*    (2012.01)
(52) U.S. Cl.
USPC ............... 705/14.54; 705/14.43; 705/14.51
(58) Field of Classification Search
USPC ...................................................... 705/14.54
See application file for complete search history.

(56) References Cited

U.S. PATENT DOCUMENTS

2009/0132340 A1* 5/2009 Demir et al. ............... 705/10

FOREIGN PATENT DOCUMENTS

| CN | 101093515 A | 12/2007 |
| CN | 101266671 A | 9/2008 |

OTHER PUBLICATIONS

International Application Serial No. PCT/CN2010/001538, Search Report and Written Opinion mailed Jul. 13, 2011, 12 pages.

* cited by examiner

*Primary Examiner* — John G Weiss
*Assistant Examiner* — Scott C Anderson
(74) *Attorney, Agent, or Firm* — Nathan O. Greene; Brinks Hofer Gilson & Lione

(57) ABSTRACT

A system and method is described herein that selects advertisements for two or more regions of a web page based on rankings of the advertisements generated using different models. By ranking advertisements separately for each region of a web page, and choosing highest ranked advertisements for each region, advertisements can be selectively chosen such that a user is more likely to select an advertisement in each region of the web page. As a result, the user experience can be enhanced and the advertising revenue can be correspondingly increased.

25 Claims, 10 Drawing Sheets

DETERMINING PLACEMENT OF ADVERTISEMENTS ON WEB PAGES

BACKGROUND OF THE INVENTION

1. Field of the Invention

The present invention generally relates to systems and methods for determining placement of advertisements on web pages, including but not limited to a search results web page.

2. Background

Addressing user's information needs has been one of the main goals of web search engines since their early days. Web search engines can provide fast and accurate results to user queries, usually for free. However, in order to provide this searching service free of charge, search engine providers, such as Yahoo™, Google™, and/or Microsoft Bing™, need to offer advertising opportunities that finance their operating costs. Web search engines may provide advertisements to the users using a variety of techniques, including banner ads, pop-up ads, and sponsored search ads, among others. These advertisements may be provided to the user at various times and can be placed at various locations on a web page. Web search engine providers often get paid from the providers of the advertisements per user selection of each advertisement, e.g., per user click. Therefore it is beneficial for the web search engine providers to maximize the use of, and thus the profit obtained from, each advertisement shown to the user.

In the case of sponsored search ads, these may be placed in various regions of a resultant web page provided to the user in response to a user query. It would be advantageous if the placement of various types of ads could be optimized in order to maximize user selection of these ads. For example, understanding how various types and/or locations of ad placement work best would both provide the most relevant ads to the user, as well as maximize per-search revenue for the search engine provider.

BRIEF SUMMARY OF THE INVENTION

A system and method in accordance with an embodiment of the present invention selects advertisements for two or more regions of a web page based on rankings of the advertisements generated using different models. By ranking advertisements separately for each region of a web page, and choosing highest ranked advertisements for each region, advertisements can be selectively chosen such that a user is more likely to select an advertisement in each region of the web page. As a result, the user experience can be enhanced and the advertising revenue can be correspondingly increased.

In particular, a method for determining placement of a plurality of advertisements on a web page is described herein. In accordance with the method, a plurality of advertisements is ranked using a first model to generate a ranked plurality of advertisements. The plurality of advertisements is ranked based at least in part on a probability of a user selection of each advertisement of the plurality of advertisements if the each advertisement is shown in a first region of the web page. A first number of highest ranked advertisements is selected for placement in the first region of the web page from the ranked plurality of advertisements. Remaining advertisements of the plurality of advertisements are ranked using a second model to generate a ranked plurality of remaining advertisements. Remaining advertisements of the plurality of advertisements are ranked based at least in part on a probability of a user selection of each remaining advertisement of the plurality of advertisements if the each remaining advertisement is shown in a second region of the web page. A second number of highest ranked advertisements are selected for placement in the second region of the web page from the ranked plurality of remaining advertisements. Furthermore, at least one of the steps is performed by at least one processor.

A system is also described herein. The system includes a first module, a second module, and an advertisement selection module. The first module is configured to calculate a probability of a user selection of each first advertisement of a plurality of first advertisements if the each first advertisement is shown in a first region of the web page. The second module configured to calculate a probability of a user selection of each second advertisement of a plurality of second advertisements if the each second advertisement is shown in a second region of the web page. The advertisement selection module is coupled to the first module and the second module. The advertisement selection module is configured to rank the plurality of first advertisements based at least on the probability of the user selection of the each first advertisement of the plurality of first advertisements and generate a ranked plurality of first advertisements. The advertisement selection module is further configured to select a first number of highest ranked advertisements for placement in the first region of the web page from the ranked plurality of first advertisements. The advertisement selection module is further configured to rank the plurality of second advertisements based at least on the probability of the user selection of the each second advertisement of the plurality of second advertisements and generate a ranked plurality of second advertisements. The advertisement selection module is further configured to select a second number of highest ranked advertisements for placement in the second region of the web page from the ranked plurality of second advertisements.

A computer program product that comprises a computer-readable medium having computer program logic recorded thereon for determining placement of a plurality of advertisements on a web page is also described herein. The computer program logic comprises first, second, third, and fourth means. The first means is for ranking the plurality of advertisements using a first model to generate a ranked plurality of advertisements based at least in part on a probability of a user selection of each advertisement of the plurality of advertisements if the each advertisement is shown in a first region of the web page. The second means is for selecting a first number of highest ranked advertisements for placement in the first region of the web page from the ranked plurality of advertisements. The third means is for ranking remaining advertisements of the plurality of advertisements using a second model to generate a ranked plurality of remaining advertisements based at least in part on a probability of a user selection of each remaining advertisement of the plurality of advertisements if the each remaining advertisement is shown in a second region of the web page. The fourth means is for selecting a second number of highest ranked advertisements for placement in the second region of the web page from the ranked plurality of remaining advertisements.

Another method is also described herein. In accordance with the method, a plurality of advertisements is ranked using a first model to generate a first ranked plurality of advertisements. The plurality of advertisements is ranked based at least in part on a probability of a user selection of each advertisement of the plurality of advertisements if the each advertisement is shown in a first region of a web page. The plurality of advertisements is ranked using a second model to generate a second ranked plurality of advertisements. The plurality of advertisements is ranked based at least in part on a probability of a user selection of each advertisement of the plurality of advertisements if the each advertisement is shown in a second region of the web page. A first number of highest ranked advertisements are selected for placement in the first region of the web page from the first ranked plurality of advertisements. A second number of highest ranked advertisements are selected for placement in the second region of the web page from the second ranked plurality of advertisements.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
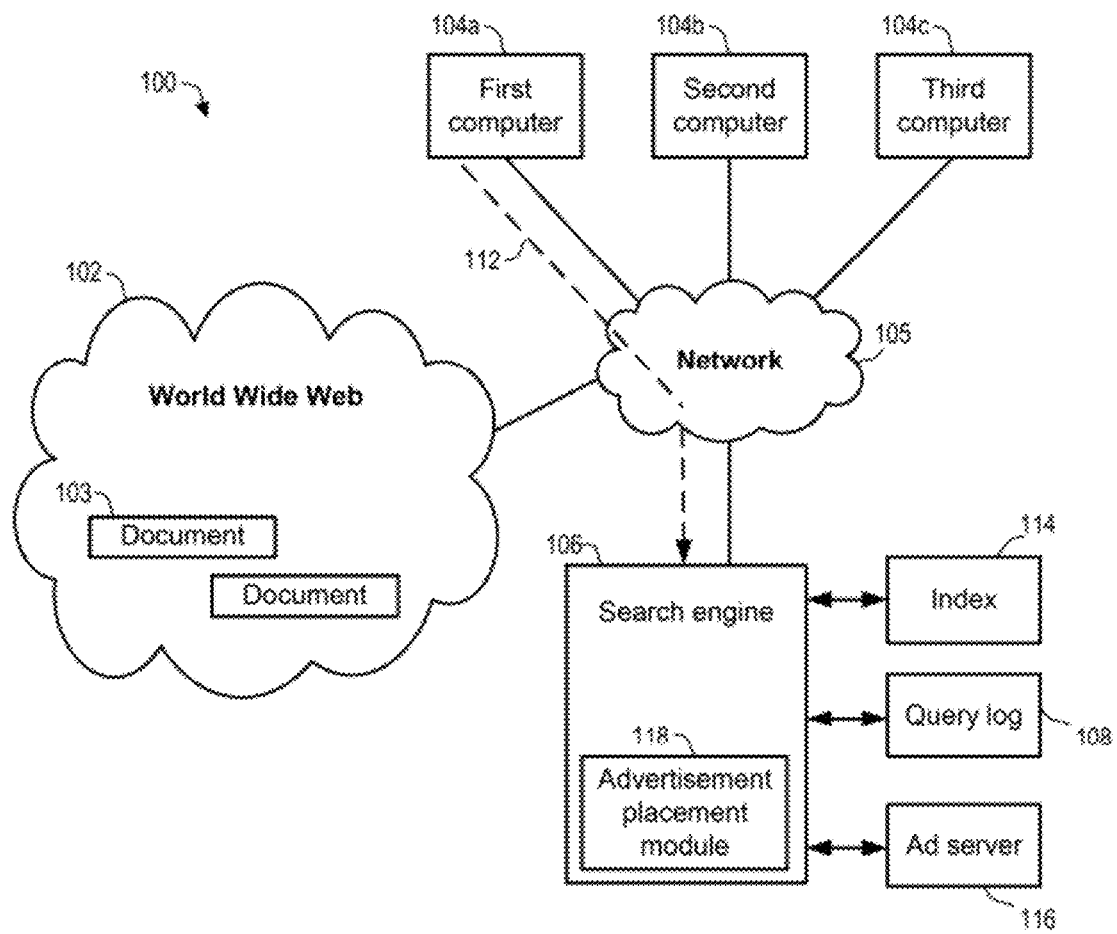
FIG. 1 is a block diagram of an information retrieval system in which an embodiment of the present invention may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

A system and method in accordance with an embodiment of the present invention selects advertisements for two or more regions of a web page based on rankings of the advertisements generated using different models. By ranking advertisements separately for each region of a web page, and choosing highest ranked advertisements for each region, advertisements can be selectively chosen such that a user is more likely to select an advertisement in each region of the web page. As a result, the user experience can be enhanced and the advertising revenue can be correspondingly increased.

FIG. 1 is a block diagram of an information retrieval system 100 in which an embodiment of the present invention may be implemented. System 100 is described herein for illustrative purposes only, and it is noted that embodiments of the present invention may be implemented in alternative environments. As shown in FIG. 1, system 100 includes a web search engine 106 (also referred to as a "search engine"). One or more computers 104, such as first computer 104a, second computer 104b and third computer 104c, are connected to a communication network 105. Network 105 may be any type of communication network, such as a local area network (LAN), a wide area network (WAN), or a combination of communication networks. In embodiments, network 105 may include the Internet and/or an intranet. Computers 104 can retrieve documents from entities over network 105. In embodiments where network 105 includes the Internet, a collection of documents, including a document 103, which form a portion of World Wide Web 102, are available for retrieval by computers 104 through network 105. On the Internet, documents may be identified/located by a uniform resource locator (URL), such as http://www.yahoo.com, and/or by other mechanisms. Computers 104 can access document 103 through network 105 by supplying a URL corresponding to document 103 to a document server (not shown in FIG. 1).

As shown in FIG. 1, search engine 106 is coupled to network 105. Search engine 106 accesses a stored index 114 that indexes documents, such as documents of World Wide Web 102. A user of computer 104a who desires to retrieve one or more documents relevant to a particular topic, but does not know the identifier/location of such a document, may submit a query 112 to search engine 106 through network 105. Search engine 106 receives query 112, and analyzes index 114 to find documents relevant to query 112. For example, search engine 106 may identify a set of documents indexed by index 114 that include terms of query 112. The set of documents may include any number of documents, including tens, hundreds, thousands, millions, or even billions of documents. Search engine 106 may use a ranking or relevance function to rank documents of the retrieved set of documents in an order of relevance to the user. Documents of the set determined to most likely be relevant may be provided at the top of a list of the returned documents in an attempt to avoid the user having to parse through the entire set of documents. The list of the returned documents may be provided in the context of a document termed a "search results page."

Search engine 106 may be implemented in hardware, software, firmware, or any combination thereof. For example, search engine 106 may include software/firmware that executes in one or more processors of one or more computer systems, such as one or more servers. Examples of search engine 106 that are accessible through network 105 include, but are not limited to, Yahoo! Search™ (at http://www.yahoo.com), Ask.com™ (at http://www.ask.com), and Google™ (at http://www.google.com).

Figure 2:
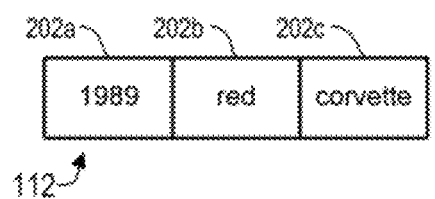
FIG. 2 shows an example query that may be submitted by a user to a search engine.

FIG. 2 shows an example query 112 that may be submitted by a user of one of computers 104a-104c of FIG. 1 to search engine 106. As shown in FIG. 2, query 112 includes one or more terms 202, such as first term 202a, second term 202b and third term 202c. Any number of terms 202 may be present in a query. As shown in FIG. 2, terms 202a, 202b and 202c of query 112 are "1989," "red," and "corvette," respectively. Search engine 106 applies these terms 202a-202c to index 114 to retrieve a document locator, such as a URL, for one or more indexed documents that match "1989," "red," and "corvette," and may return a list of such document(s) and their associated URL(s), wherein the list is sorted in accordance with a ranking.

As also shown in FIG. 1, search engine 106 may generate a query log 108. Query log 108 is a record of searches that are performed using search engine 106. Query log 108 may include a list of queries, by listing query terms (e.g., terms 202 of query 112) along with further information/attributes for each query, such as a list of documents identified based on the query, a list/indication of documents in the list that were selected/clicked on ("clicked") by a user reviewing the list, a ranking of clicked documents, a timestamp indicating when the query is received by search engine 106, an IP (internet protocol) address identifying a unique device (e.g., a computer, cell phone, etc.) from which the query terms were submitted, an identifier associated with a user who submits the query terms (e.g., a user identifier in a web browser cookie), and/or further information/attributes.

As shown in FIG. 1, system 100 also includes an ad server 116 connected to search engine 106. Ad server 106 may be a computer or other processing system, including one or more processors, that is capable of serving a plurality of ads to search engine 106. Ad server 106 may receive the plurality of ads from one or more advertisers (not shown).

As further shown in FIG. 1, system 100 also includes an advertisement placement module 118 connected to search engine 106 and query log 108. Advertisement placement module 118 is configured to select advertisements for placement in each of multiple regions of a web page. Advertisement placement module 118 uses multiple models (i.e., where each model may be a machine-learned model) for ranking advertisements for placement in each region of a web page. Each of the models may be specifically trained to rank ads in order of probability of being selected by a user. Advertisement placement module 118 may also use a bid, or some other advertising characteristic, that is combined with the probability of being selected by a user (also referred to as "user click probability"), to generate a ranking score for each ad that is used to rank the advertisements.

Advertisement placement module 118 ranks advertisements using a first model for selecting ads for placement in a first region of a web page. Advertisement placement module 118 selects highest ranked ads from a plurality of ranked advertisements ranked using the first model for placement in the first region of the web page. Advertisement placement module 118 also ranks advertisements using a second model for placement in a second region of the web page. Advertisement placement module 118 selects highest ranked ads from a plurality of ranked advertisements ranked using the second model for placement in the second region of the web page. Selective placement of advertisements in various regions of a web page operates to place the advertisements in the regions in which they are most likely to be selected by a user and/or generate most advertising revenue for the search engine provider.

In one example embodiment, advertisement placement module 118 may use a different model for calculating user click probability for each region of web page, as the user click probability may differ for the same ad depending on what region of the web page the ad is placed in and shown to the user. For example, an ad may have a high user click probability if placed in the first region of the web page, and the same ad may have a relatively lower user click probability if placed in the second region of the web page.

The first model may calculate user click probability for the first ad based on analysis of one or more characteristics of the ad, the region of the web page where the ad is to be placed (i.e., the first region of the web page), and other features, such as a user query. For example, the first model can determine that based on a relatively high relevance of the ad and the user query, this ad may have a high user click probability if placed in the first region of the web page. In other words, in this example, ads that have a high relevancy correlation between the user query and the ad have a high user click probability for the first region of the web page.

The second model may calculate user click probability for the first ad based on analysis of one or more characteristics of the ad, the region of the web page where the ad is to be placed (i.e., the second region of the web page), and other features, such as the user query. For example, the second model can determine that based on a relatively high relevance of the ad and the user query, this ad may have a relatively lower user click probability if placed in the second region of the web page. In other words, in this example, ads that have a high relevancy correlation (e.g., are directly relevant to the user query) between the user query and the ad have a relatively lower user click probability for the second region of the web page, and ads with an indirect relevancy correlation (e.g., are only indirectly relevant to the user query) would do better (i.e., would have a higher user click probability) if placed in the second region of the web page.

By separately ranking advertisements for placement in each region of a web page, advertisement placement module 118 can advantageously improve the experience of the user of the search engine as well as maximize advertising revenue for the search engine provider. For example, in accordance with certain embodiments, such ranking will enable the search engine to select and place ads in a region of a web page where the user is most likely to select them. This approach also represents an improvement over one in which all of the ads are ranked only once, and where the search engine selects a number of highest ranked ads for placement in a first region of the web page and a number of next highest ranked ads for placement in a second region of the web page, and so forth.

This conventional approach does not recognize that the user may find different types of ads desirable in each region of a web page, and/or that the user may find the same type of ad desirable in one region of the web page but not in another region of the web page. The approach implemented by advertisement placement module 118 according to the embodiment(s) described herein is thus deemed preferable, as it is able to rank a plurality of ads based on their placement on a web page.

The manner in which advertisement placement module 118 ranks advertisements using multiple models and the manner in which advertisement placement module 118 places highest ranked advertisements in a corresponding region of a web page will be described in more detail below.

Like search engine 106, advertisement placement module 118 may be implemented in hardware, software, firmware, or any combination thereof. For example, advertisement placement module 118 may include software/firmware that executes in one or more processors of one or more computer systems, such as one or more servers.

B. Determining Placement of Advertisements on Web Pages

Figure 3:
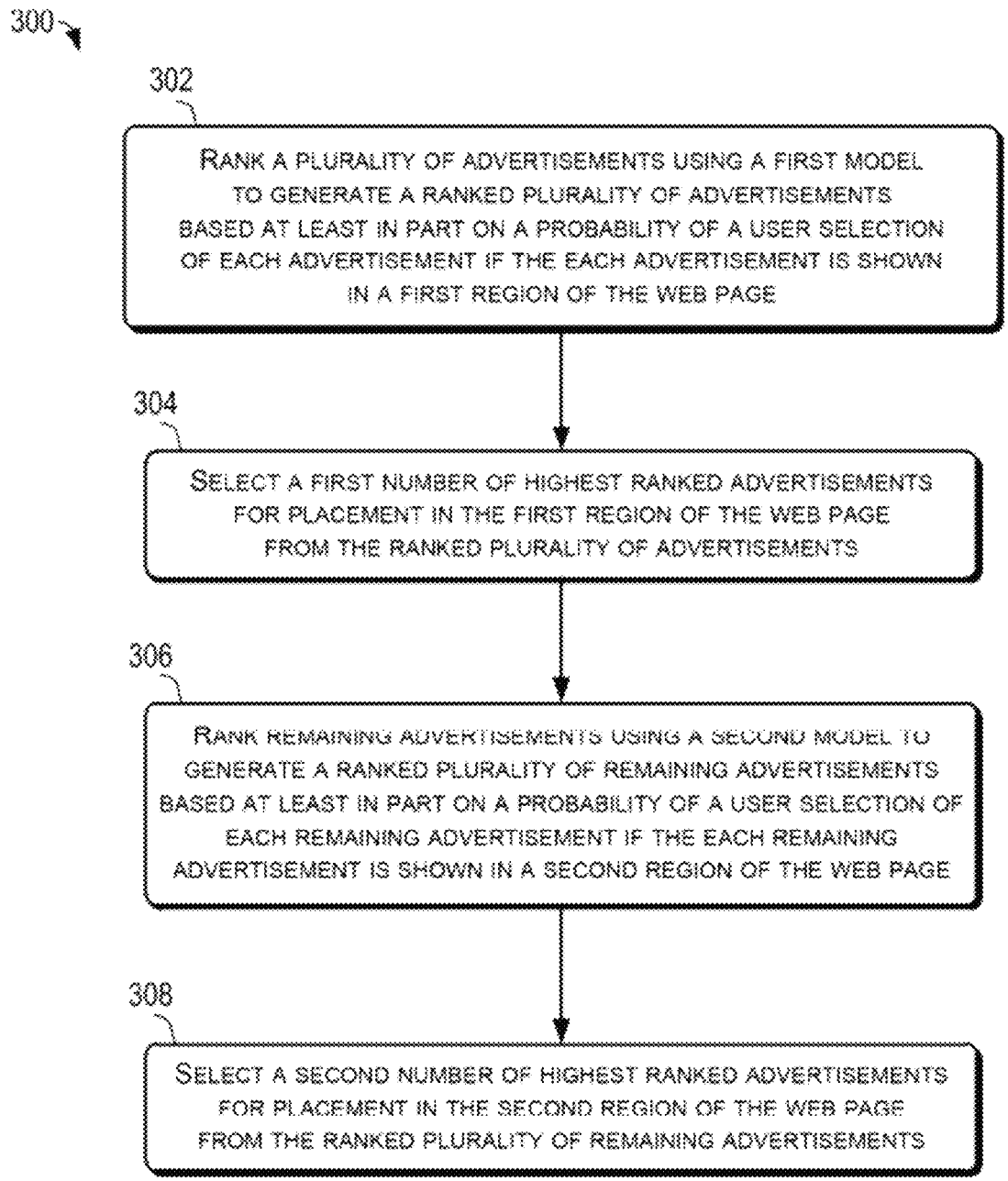
FIG. 3 depicts a flowchart of a method for determining placement of a plurality of advertisements on a web page in accordance with an embodiment described herein.

FIG. 3 depicts a flowchart 300 of a method for determining placement of a plurality of advertisements on a web page in accordance with an embodiment described herein. The method of flowchart 300 will be described in reference to elements of system 100. However, it is noted that the method is not limited to that implementation. Also, the method of flowchart 300 may be modified by those skilled in the art in order to derive alternative embodiment(s). Also, the steps may occur in a different order than shown, some steps may be performed concurrently, some steps may be combined with other steps, and/or some steps may be absent, as desired.

As shown in FIG. 3, the method of flowchart 300 begins at step 302 in which advertisement placement module 118 ranks a plurality of advertisements using a first model to generate a ranked plurality of ads based at least in part on a probability of a user selection of each advertisement (also referred to as an "ad") of the plurality of ads if each ad is shown in a first region of the web page. The user may be, for example, any of the users of computers 104a-104c, and the ads may be any advertisements that are provided to search engine 106 by ad server 116 in a manner previously described. The plurality of ads may be ranked according to a ranking score that includes the probability of a user selection of each ad from the plurality of ads if that ad is shown in the first region of the web page. Thus, if the web page includes additional regions, such as a second and a third regions, in step 302 advertisement placement module 118 may rank the plurality of ads by calculating a ranking score indicative of an expected revenue from placing each ad in the first region of the web page, but not in the second and/or the third regions. The plurality of ads that are ranked by advertisement placement module 118 in step 302 may be referred to as a ranked plurality of ads.

Figure 4:
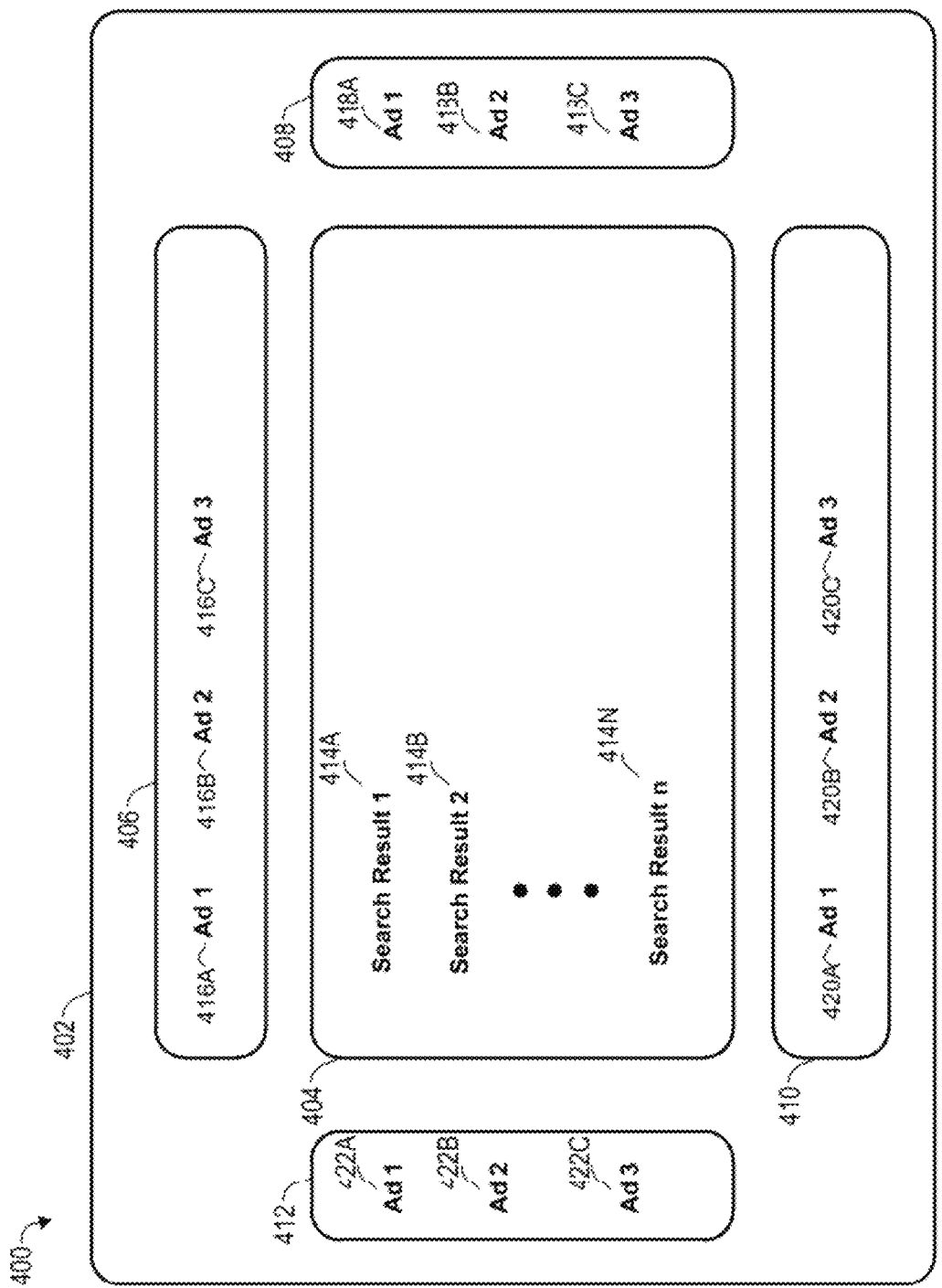
FIG. 4 depicts a diagram of an exemplary web page with multiple regions in accordance with an embodiment described herein.

FIG. 4 depicts a diagram 400 of an exemplary web page 402 with multiple regions in accordance with an embodiment described herein. In an example embodiment, web page 402 includes a search results region 404, a first region of the web page 406, a second region of the web page 408, a third region of the web page 410, and a fourth region of the web page 412. Each of regions of the web page 406-412 may contain one or more ads, such as sponsored search ads provided by ad server 116, as described in more detail below. It will be apparent to persons skilled in the relevant art(s) that web page 402 may include additional or fewer regions than what is described herein, and that regions of the web page 406-412 are provided for illustrative purposes only and are not intended to be limiting.

A sponsor providing each advertisement (e.g., by using ad server 116) may pay the provider of search engine 106 for each time that the advertisement is selected by a user of the search engine. The amount paid may be referred to as a "bid price." Thus, it is beneficial for the provider of search engine 106 to maximize the amount of times each ad (e.g., a sponsored search ad) is viewed and selected by a user, as that may directly provide financial benefit to the provider of search engine 106. It is to be understood, of course, that other financial arrangements, such as cost per impression and/or cost per conversion, may be used in addition to, or instead of, the one described herein.

In an example embodiment, advertisement placement module 118 ranks ads in order of a ranking score assigned to each ad. The ranking score may be calculated using a probability of a user selection ("user click probability") of each ad if the ad is shown in one of regions of the web page 406-412 as well as a bid for the ad. The bid for each ad may be indicative of advertising revenue related to a user selection of the ad, such as a user click on the ad. For example, a ranking score for each ad may be substantially equal to a user click probability for that ad multiplied by a bid for that ad. In this example, the ranking score may be calculated using the following calculation:

$$\text{eCPM} = P(\text{click}) * \text{bid}(\text{ad}),$$

where eCPM is the effective Clicks Per Mile, P(click) is the user click probability for an ad, and bid(ad) is a bid for the ad. Thus, advertisement placement module 118 may calculate a ranking score for each ad to be placed in first region 406 using a P(click) calculated by the first model and a bid(ad) for each respective ad. Advertisement placement module 118 may also calculate a ranking score for each ad for placement in second region 408 using a P(click) calculated by the second model and a bid(ad) for each respective ad. The bid(ad) used by advertisement placement module 118 may be the same if calculating eCPM for the same ad for placement different regions of web page 406-412, but P(click) for the same ad may be different as it is being calculated by two different models, i.e., the first and the second models, for placement in different regions of web page 406-412.

In one embodiment, advertisement placement module 118 may use the same same eCPM calculation to calculate the ranking score for each ad to be placed in each region of web page 406-412. In another embodiment, advertisement placement module may use a different calculation for calculating of the ranking score for each ad for placement in each region of web page 406-412. For example, the ranking score may be calculated using Cost Per Click (CPC), Cost Per Lead (CPL), Cost Per Acquisition (CPA), Cost Per Sale (CPS), dynamic Cost Per Mile (dCPM), effective versions of these calculations, etc. It will be apparent to persons skilled in the relevant art(s) that the example calculation(s) described above may include additional or fewer elements and calculations than what is described herein, and that the example calculation(s) are provided for illustrative purposes only and are not intended to be limiting.

Returning now to the description of FIG. 3, in step 304 advertisement placement module 118 selects a first number of highest ranked advertisements for placement in first region 406 from the ranked plurality of advertisements. For example, advertisement placement module 118 may select the top three ads (based on their respective ranking scores) from a ranked plurality of advertisements that were ranked for first region 406 for placement in first region 406. In one example embodiment, advertisement placement module 118 may select up to a pre-determined number of ads from the ranked plurality of advertisements ranked for first region 406 that have a ranking score greater than a threshold. For example, advertisement placement module 118 may only select one ad (i.e., the highest ranked ad) from the ranked plurality of advertisements ranked for first region 406 if only the highest ranked ad has a ranking score that is higher than the threshold. In another example, advertisement placement module 118 may select three ads (i.e., the highest three ranked ads) from the ranked plurality of advertisements ranked for first region 406 if the highest five ranked ads have a ranking score that is higher than the threshold and the pre-determined number of ads that can be shown at one time in first region 406 is three.

With reference back to FIG. 4, search results region 404 may contain one or more search results 414A, 414B, and 414C, which may correspond to search results generated by search engine 106 for a user query. FIG. 4 also shows first region of the web page 406 that contains several ads 416A, 416B, and 416C, such as sponsored search ads and/or banner ads. In one example embodiment, each ad 416A-C that is placed in first region of the web page 406 ("first region 406") is selected from the ranked plurality of ads that are ranked for first region 406. The ranked plurality of ads may be ranked based on a ranking score that may be calculated using probability of a user selection of each ad if that ad is shown in first region 406 as well as a bid for each ad. In one embodiment, first ad 416A may have a highest ranking score out of a plurality of ranked advertisements that are ranked for first region 406. Similarly, second ad 416B and third ad 416C may have a second highest ranking score and a third highest ranking score, respectively. First region 406 may be referred to as the "north region."

Returning now to the description of FIG. 3, in step 306 advertisement placement module 118 ranks remaining ads of the plurality of ads using a second model to generate a ranked plurality of remaining advertisements based at least in part on a probability of a user selection of each remaining ad of the plurality of ads if the each remaining ad is shown in second region of the web page 408.

In an example embodiment, one or more ads that are selected for placement in step 304 may be removed from the plurality of ads prior to advertisement placement module 118 ranking remaining ads of the plurality of ads using a second model in step 306. The plurality of ads without the one or more ads that were selected for placement in step 304 may be referred to as remaining ads of the plurality of ads. However, in alternate embodiments, such as described with reference to FIG. 8, advertisement placement module 118 re-ranks the plurality of ads using a second model without removing the one or more ads that are selected for placement in first region 406.

The remaining ads of the plurality of ads may be ranked according to a ranking score that includes the probability of a user selection of each remaining ad from the plurality of ads if that remaining ad is shown in second region of the web page 408. Thus, in step 306, advertisement placement module 118 may rank the remaining ads of the plurality of ads by calculating a ranking score indicative of expected revenue from placing each remaining ad in the second region of the web page, but not the first region (and any other region(s) if present).

With reference back to FIG. 4, second region of the web page 408 contains several ads 418A, 418B, and 418C, such as sponsored search ads and/or banner ads. In one example embodiment, each ad 418A-C that is placed in second region of the web page 408 ("second region 408") is selected from ranked plurality of ads that are ranked for second region 408. The ranked plurality of ads may be ranked based on a ranking score that includes probability of a user selection of each ad if that ad is shown in second region 408 as well as a bid for each ad. In one embodiment, first ad 418A may have a highest ranking score out of a plurality of advertisements that are ranked for second region 408. Similarly, second ad 418B and third ad 418C may have a second highest ranking score and a third highest ranking score, respectively. Second region 408 may be referred to as the "east region."

Returning now to the description of FIG. 3, in step 308 advertisement placement module 118 selects a second number of highest ranked advertisements for placement in second region 408 from the ranked plurality of remaining advertisements. For example, advertisement placement module 118 may select the top three ads (based on their respective ranking scores) from a ranked plurality of remaining advertisements that were ranked for second region 408 for placement in second region 408. In one example embodiment, advertisement placement module 118 may select up to a pre-determined number of ads from the ranked plurality of remaining advertisements ranked for second region 408 that have a ranking score greater than a threshold. For example, advertisement placement module 118 may only select one ad (i.e., the highest ranked ad) from the ranked plurality of remaining advertisements ranked for second region 408 if only the highest ranked ad has a ranking score that is higher than the threshold. In another example, advertisement placement module 118 may select three ads (i.e., the highest three ranked ads) from the ranked plurality of remaining advertisements ranked for second region 408 if the highest five ranked ads have a ranking score that is higher than the threshold and the pre-determined number of ads that can be shown at one time in second region 408 is three. In one implementation, the threshold used in step 308 is the same as the threshold used in step 304. In another implementation, the threshold used in step 308 is different from the threshold used in step 304.

With reference back to FIG. 4, third region of the web page 410 contains several ads 420A, 420B, and 420C, such as sponsored search ads and/or banner ads. In one example embodiment, each ad 420A-C that is placed in third region of the web page 410 ("third region 410") is selected from ranked plurality of ads that are ranked for third region 410. The ranked plurality of ads may be ranked based on a ranking score that is calculated using probability of a user selection of each ad if that ad is shown in third region 410 as well as a bid for each ad. In one embodiment, first ad 420A may have a highest ranking score out of a plurality of advertisements that are ranked for third region 410. Similarly, second ad 420B and third ad 420C may have a second highest ranking score and a third highest ranking score, respectively. Third region 410 may be referred to as the "south region." In one implementation, ads shown in east region 408 may be the same as ads shown in south region 410.

Fourth region of the web page 412 contains several ads 422A, 422B, and 422C, such as sponsored search ads and/or banner ads. In one example embodiment, each ad 422A-C that is placed in fourth region of the web page 412 ("fourth region 412") is selected from ranked plurality of ads that are ranked for fourth region 412. The ranked plurality of ads may be ranked based on a ranking score that is calculated using probability of a user selection of each ad if that ad is shown in fourth region 412 as well as a bid for each ad. In one embodiment, first ad 422A may have a highest ranking score out of a plurality of advertisements that are ranked for fourth region 412. Similarly, second ad 422B and third ad 422C may have a second highest ranking score and a third highest ranking score, respectively. Fourth region 412 may be referred to as the "west region."

Figure 5:
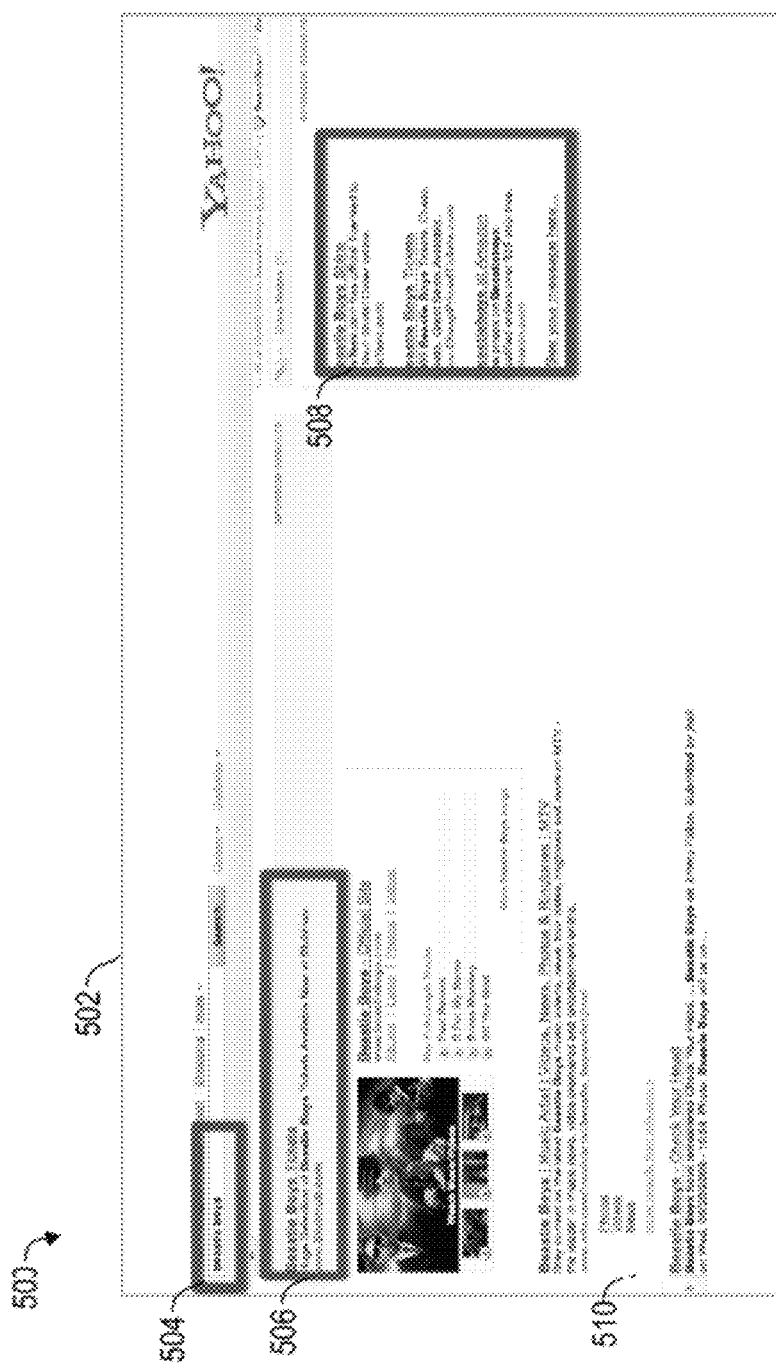
FIG. 5 illustrates a screenshot of an exemplary web page that is an example implementation of web page shown in FIG. 4 in accordance with an embodiment described herein.

FIG. 5 illustrates a screenshot 500 of an exemplary web page 502 that is an example implementation of web page 402 shown in FIG. 4 in accordance with an embodiment described herein. Web page 502 includes a user query region 504, a first region of the web page 506, a second region of web the page 508, and search results 510. User query region 504 may include a query, such as query 112. In the example shown in FIG. 5, the user query is "Beastie Boys." Advertisement placement module 118 may rank a plurality of ads, such as ads received from ad server 116, using a first model and a bid for each of the plurality of ads. In this example, advertisement placement module 118 selects one ad (i.e., the highest of the ranked plurality of ads) for placement in first region 506 out of the ranked plurality of ads. In this example, only one ad is selected for placement in first region 506, and that single ad is directed to "Beastie Boys Tickets" provided by "stubhub.com."

In an example embodiment, advertisement placement module 118 may rank remaining ads of the plurality of ads (i.e., the plurality of ads without the ad shown in first region 506) using a second model to generate a ranked plurality of remaining ads. In an alternate embodiment, advertisement placement module 118 may rank the plurality of ads (i.e., the plurality of ads with the ad shown in first region 506) using the second model. In accordance with the example embodiment, advertisement placement module 118 selects three ads out of the ranked plurality of remaining ads for placement in second region 508.

1. Advertisement Placement Module

Figure 6:
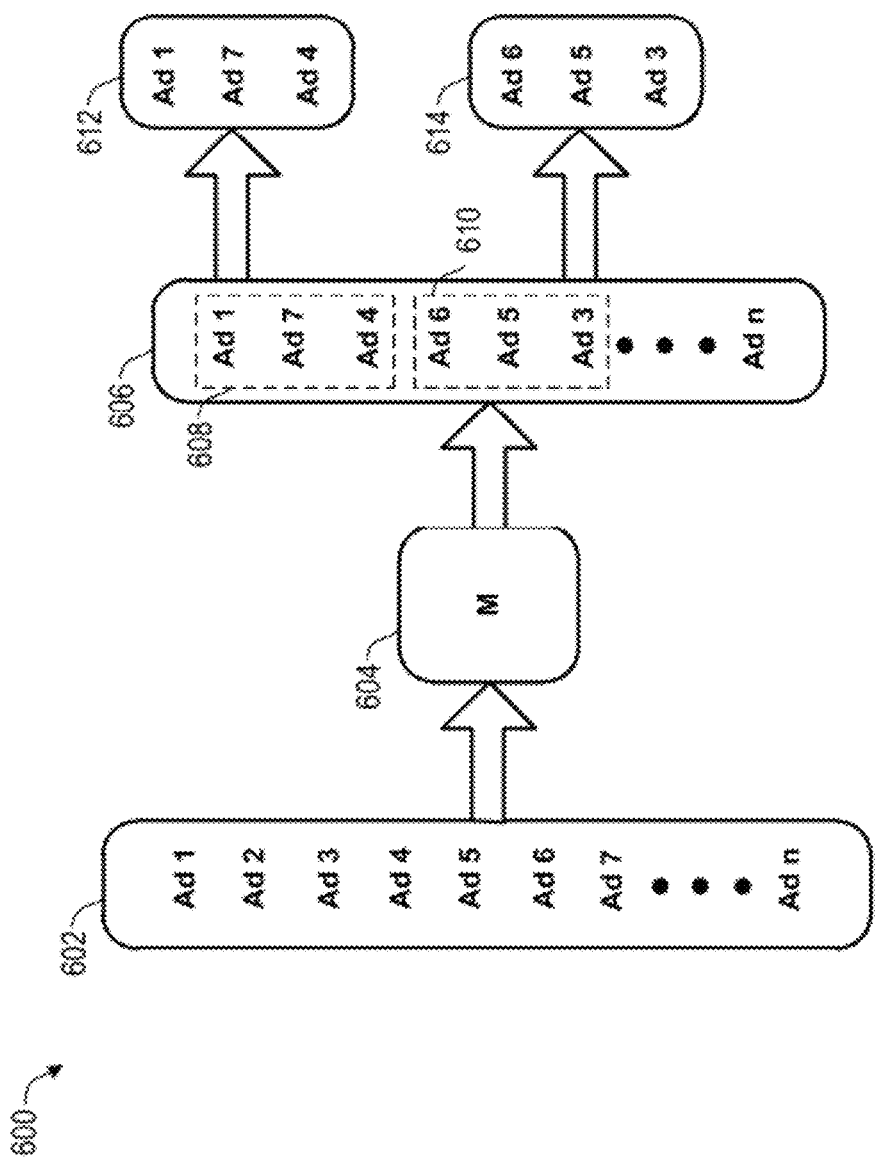
FIG. 6 illustrates a conventional implementation of an advertisement placement module shown in FIG. 1.

FIG. 6 illustrates a conventional implementation 600 of advertisement placement module 118 shown in FIG. 1. FIG. 6 illustrates that advertisement placement module 600 operates on a plurality of ads 602 that includes ads 1-7, . . . , n. Plurality of ads 602 may be received from ad server 116. Advertisement placement module 600 uses a model 604 to generate a ranked plurality of advertisements 606 based at least in part on a probability of a user selection of each advertisement of plurality of advertisements 602 if each advertisement is shown anywhere on web page 402 (e.g., in any region 406-412 of web page 402).

Advertisement placement module 600 selects a first number of highest ranked advertisements 608 for placement in first region of web page 406 from ranked plurality of advertisements 602. In the example shown in FIG. 6, advertisement placement module 600 selects ads 612 including ads 1, 7, and 4 for placement in first region 406. Next, advertisement placement module 600 selects a second number of highest ranked advertisements 610 for placement in second region of web page 408 from ranked plurality of advertisements 606. In the example shown in FIG. 6, advertisement placement module 600 selects three ads 614 including ads 6, 5, and 3 for placement in second region 408. Thus, advertisement placement module 600 selects the top three ads 612 from ranked plurality of ads 606 for placement in first region 406 and selects the next top three ads 614 from the same ranked plurality of ads 606 for placement in second region 408.

Figure 7:
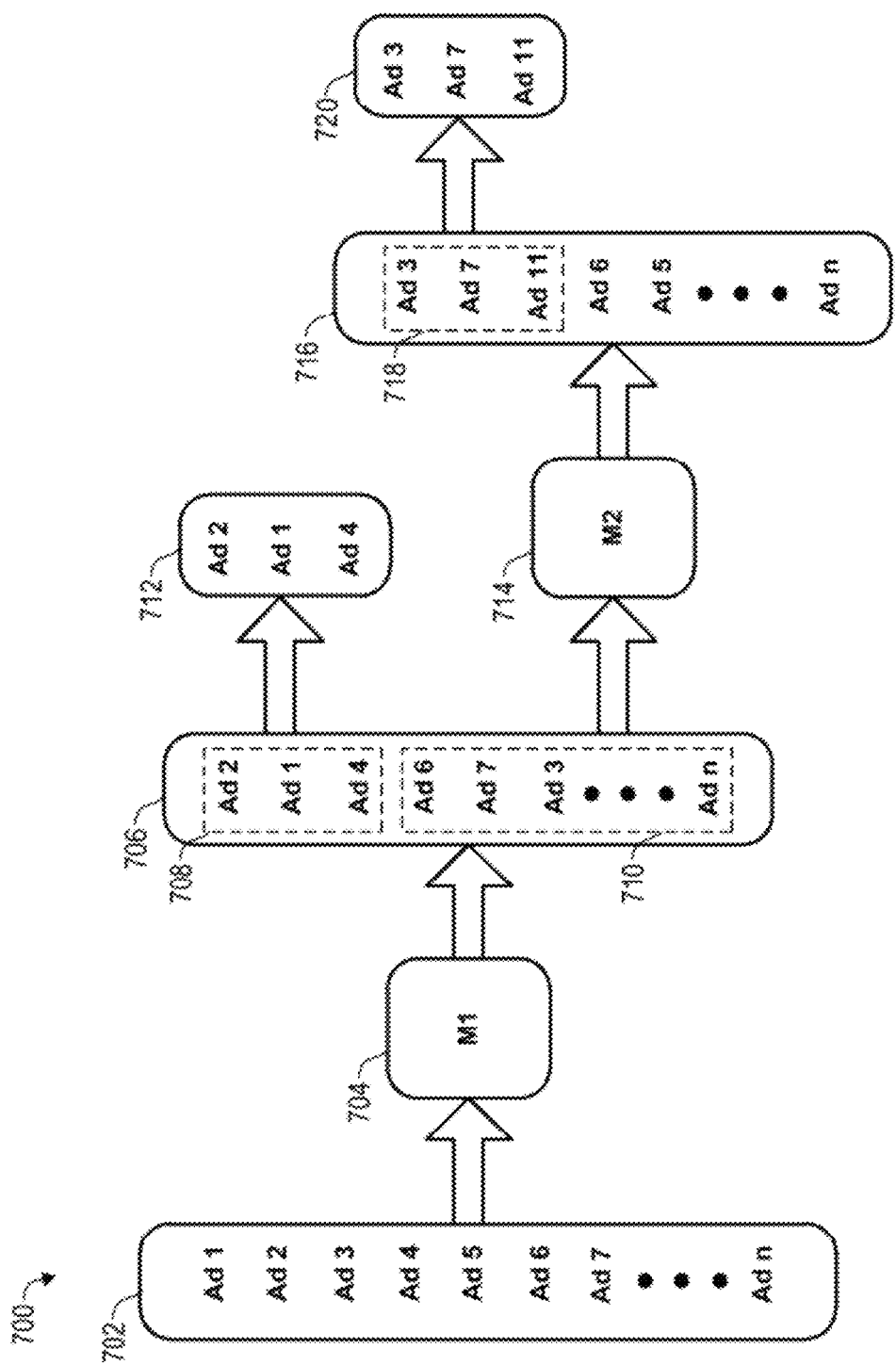
FIG. 7 shows an example implementation of an advertisement placement module shown in FIG. 1 in accordance with an embodiment described herein.

FIG. 7 shows an example implementation 700 of advertisement placement module 118 shown in FIG. 1 in accordance with an embodiment described herein. FIG. 7 illustrates that advertisement placement module 700 operates on a plurality of ads 702 that includes ads 1-7, . . . , n. Plurality of ads 702 may be received from ad server 116. Advertisement placement module 700 uses a first model 704 to generate a ranked plurality of advertisements 706 based at least in part on a probability of a user selection of each advertisement of plurality of advertisements 702 if each advertisement is shown in a first region of the web page, such as first region 406. It is noted that advertisement placement module 700 may calculate a ranking score for each ad in plurality of ads 702, such as by using a user click probability and a bid for each ad, during or prior to ranking plurality of ads 702.

Advertisement placement module 700 selects a first number of highest ranked advertisements 708 for placement in first region of the web page 406 from ranked plurality of advertisements 706. As described above, in one example advertisement placement module 700 may select up to a pre-determined number of ads, such as up to three ads 708, from ranked plurality of ads 706, that have ranking scores higher than a threshold. It is noted that in other embodiments, advertisement placement module 700 may select up to a pre-determined number of ads from ranked plurality of ads 706 that have ranking scores higher than or equal to the threshold. In the example shown in FIG. 7, advertisement placement module 700 select top three ads 712 including ads 2, 1, and 4 for placement in first region 406.

Advertisement placement module 700 ranks remaining advertisements of the plurality of advertisements 710 using a second model 714 to generate a ranked plurality of remaining advertisements 716 based at least in part on a probability of a user selection of each remaining advertisement of the plurality of advertisements 710 if each remaining advertisement is shown in second region 408. In the example shown in FIG. 7, advertisement placement module 700 ranks remaining advertisements of the plurality of advertisements 710 including ads 6, 7, and 3, . . . , n to generate ranked plurality of remaining advertisements 716 including ads 3, 7, 11, 6, and 5, . . . , n. It is noted that advertisement placement module 700 may calculate a ranking score for each remaining ad in plurality of ads 710, such as by using a user click probability and a bid for each ad, during or prior to ranking the remaining ads of the plurality of ads 710.

Advertisement placement module 700 selects a second number of highest ranked advertisements 718 for placement in second region of the web page 408 from ranked plurality of remaining advertisements 716. As described above, in one example advertisement placement module 700 may select up to a pre-determined number of ads, such as up to three ads 718, from ranked plurality of remaining ads 716 that have ranking scores higher than a threshold. It is noted that in other embodiments, advertisement placement module 700 may select up to a pre-determined number of ads from ranked plurality of remaining ads 716 that have ranking scores higher than or equal to the threshold. Advertisement placement module 700 may use three selected ads 720 for placement in second region 408. In the example shown in FIG. 7, advertisement placement module 700 selects top three ads 720 including ads 3, 7, and 11 for placement in second region 408.

Thus, as can be seen from the discussion of FIG. 7, advertisement placement module 700 that is implemented in accordance with an embodiment described herein is configured to rank a plurality of ads using a separate model for different regions of web page 406-412. This is desirable because different regions of web page 406-412 may have different probabilities of user selection of the same advertisement if that advertisement is shown in different regions of web page 406-412. For example, an advertisement may have a high probability of user selection if that advertisement is shown in first region 406, but the same advertisement may have a lower probability of user selection if that advertisement is shown in second region 408.

a. Machine Learned Models

In one example embodiment, each of the models used by advertising placement module 118 is a machine learned model. For example, advertising placement module 700 (which is one implementation of advertising placement module 118) may use first model 704 for calculating probability of a user selection of an ad if the ad is shown in first region of the web page 406. Advertising placement module 700 may use second model 714 for calculating probability of a user selection of an ad if the ad is shown in second region of the web page 408. As described below, first model 704 may be trained to identify one or more features related to the one or more of characteristics of a user query, an advertisement, or first region 406 that are indicative of the user selection of the advertisement if the advertisement is shown in first region 406. As described below, second model 714 may be trained to identify one or more features related to the one or more of characteristics of a user query, an advertisement, or second region 408 that are indicative of the user selection of the advertisement if the advertisement is shown in second region 408.

Each ad 416A-C that is placed in first region of the web page 406 is selected based on a ranking score that includes probability of a user selection of each advertisement of the plurality of advertisements if that advertisement is shown in first region of the web page 406. For example, first model 704 may calculate probability of a user selection of each advertisement of the plurality of advertisements based at least on similarities between a query submitted by the user to a search engine and text of each ad. First model 704 may analyze one or more features related to one or more of user characteristics, a user query, the plurality of advertisements, or a region of the web page to calculate the probability of user selection of each advertisement if each advertisement is shown in first region 406. Similarly, each ad 418A-C that is placed in second region of the web page 408 is selected based on a ranking score that includes probability of a user selection of each advertisement if that advertisement is shown in second region of the web page 408.

As noted elsewhere, advertising placement module 700 may rank the plurality of advertisements based on the user click probability and a bid for each ad. Each of models 704 and 714 may thus calculate a probability of the user selection of each ad if shown in a respective region of web page 402. Advertisement placement module 700 is configured to use the calculated probability for each ad, along with one or more other factors, such as a bid for the ad, to generate a ranking score for each ad. Advertisement placement module 700 is configured to rank the plurality of ads according to their ranking scores.

Each of models 704 and 714 may analyze one or more features related to the user, one or more of the ads, any similarities between a query submitted by the user to a search engine and text of each ad, as related to a respective region of web page 402, among others. Furthermore, each of models 704 and 714 may analyze a correlation between a relevance of each ad to a user query and region of web page 402 the ad may be placed.

In an example embodiment, each of models 704 and 714 may analyze one or more of textual similarities (also referred to as syntactic features) and/or semantic features, related to a user query and the text and/or context of each ad. Furthermore, each of models 704 and 714 may analyze environmental features and click feedback features relating to each ad, the user, etc. Syntactic features are described in more detail below. Semantic features may relate to any subject and/or topic relationship between the user query and each ad. For example, a semantic feature may indicate a relationship between a user query of "auto" and an ad directed to a "tire." Environmental features may be related to time of day, week, month a user posts the user query, a geographical and/or geo-political location of the user, etc.

Click feedback features may relate to historical performance of each ad. In one embodiment, the plurality of ads may be stored using one or more ad databases. The ad databases may be organized using a hierarchical structure that has multiple levels. For example, an ad database may use four hierarchical levels for storing the plurality of ads, such as an "ad account," an "ad campaign," an "ad group," and an "ad." Click feedback features may be relate to analyzing historical performance of each ad of the plurality of ads and all of hierarchical levels for that ad. For example, click feedback features may analyze historical click through rate ("CTR") for an ad as well as for all four levels of the ad database for that ad.

For example, each of models 704 and 714 may analyze textual (syntactic) features to compute any textual similarity between a query and each ad. The textual features may include the length and/or number of terms in the user query and each ad, cosine similarity between the user query and each ad, Jaccard coefficient for the user query and each ad, size of an intersection of the characters for the user query and each ad, and/or Levenshtein edit distance between the user query and each ad, among others. A measure of textual similarity between the user query and each ad may also include any of a variety of techniques known in the art for measuring the textual similarity between different words or strings of words for the user query and each ad. For example, such techniques may involve identifying common terms or underlying concepts among the different words or strings of words. Persons skilled in the relevant art(s) will readily appreciate that other types of the above listed features may be considered instead, or in addition to, the ones described.

Each of models 704 and 714 is configured to automatically use training data to construct machine learned rules, such as by using any of the supervised learning methods known in the art. Thus, first model 704 may receive and process its respective training data to derive a model or algorithm for identifying to identify one or more features (including any textual (syntactic), semantic, click feedback, and/or environmental features) related to the one or more of the user characteristics, a user query, the plurality of advertisements, or a region of the web page that are indicative of the user selection of each advertisement if each advertisement is shown in first region 406. Similarly, second model 714 may receive and process its respective training data to derive a model or algorithm for identifying to identify one or more features (including any textual (syntactic), semantic, click feedback, and/or environmental features) related to the one or more of the user characteristics, a user query, the plurality of advertisements, or a region of the web page that are indicative of the user selection of each advertisement (i.e., each remaining advertisement) if each advertisement is shown in second region 408.

In one embodiment, each of models 704 and 714 may learn that a particular feature is particularly relevant for making this identification. In this case, that feature will figure more prominently in the algorithm. In contrast, if each of models 704 and 714 learns that a particular feature is not relevant for making the identification, the feature may not figure prominently or at all in the algorithm. Once the machine learned rules are created for each of models 704 and 714, the machine learned rules may be verified using any of the techniques known in the art. In one example embodiment, the training data for each of models 704 and 714 is created automatically.

For example, each of models 704 and 714 may use training data already available from index 114, query log 108, and/or ad server 116, such as using search engine providers production data. In one example embodiment, some of the training data for each of models 704 and 714 may be created manually in addition to using the automatically created training data.

For example, the training data may include data that enables each machine learned model 704 and 714 to determine which features correspond to an ad performing well in first region 406 and which features correspond to an ad performing well in second region 408. In one implementation, the training data used for both machine learned models 704 and 714 is the same. However, based on the training data, each machine learned model 704 and 714 may select different features and/or weigh each feature differently. For example, during training, first model 704 may learn that a relatively high relevance between an ad and the user query will result in a user selection of the ad if that ad is shown in first region 406. Similarly, during training, second model 704 may learn that a relatively low relevance between an ad and the user query will result in a user selection of the ad if that ad is shown in second region 408.

Once first and second models 704 and 714 are trained, they may be operable to calculate probabilities of a user selection of an ad if the ad is shown in first region 406 or a second region 408 respectively. For example, for a user query of a "BMW," first model 704 may analyze each ad from a plurality of ads (such as provided by ad server 116), the relevance of each ad to the user query, and how well other ads with a given relevance to the user query perform in first region 406. First model 704 may also analyze one or more features related to one or more of user characteristics, such as based on past history on how the user performed searches on German cars, luxury cars, transportation, etc. First model 704 may also analyze any textual (syntactic), semantic, click feedback, and/or environmental features related to the user query and each ad in the plurality of ads. Based on this analysis, first model 704 may calculate the probability of user selection of each ad if the ad is shown in first region 406. For example, first model 704 may calculate highest probabilities of user selection for ads to be placed in first region 406 that are directly relevant to the user query. In this example, the directly relevant ads may include ads directed to the BMW™ home page and BMW dealers.

In accordance with the above example, for the same user query of a "BMW," second model 714 may analyze each ad from the plurality of ads (such as provided by ad server 116) or from a remaining plurality of ads, the relevance of each ad to the user query, and how well other ads with a given relevance to the user query perform in second region 408. Second model 714 may also analyze one or more features related to one or more of user characteristics, such as based on past history on how the user performed searches on German cars, luxury cars, transportation, etc. Second model 714 may also analyze textual (syntactic), semantic, click feedback, and/or environmental features related to similarities between the user query and each ad in the plurality of ads. Based on this analysis, second model 714 may calculate the probability of user selection of each ad if the ad is shown in second region 408. For example, second model 714 may calculate highest probabilities of user selection for ads to be placed in second region 408 that are only indirectly relevant to the user query. In this example, the indirectly relevant ads may include ads directed to other car manufacturers, i.e., not BMW. For example, second model 714 may calculate highest probabilities of user selection for ads to be placed in second region 408 directed to Audi™ or Cadillac™, but not BMW. In other words, second model 714 may calculate lower probabilities of user selection for ads to be placed in second region 408 that are directly relevant to the user query.

Also, it will be apparent to persons skilled in the relevant art(s) that the example analysis described above may include additional or fewer types of analysis than what is described herein, and that the example analysis is provided for illustrative purposes only and is not intended to be limiting. For example, advertising placement module 118 may use a separate additional machine learned model associated with third region 410 and fourth region 412 to calculate probabilities of a user selection of an ad if the ad is shown in third region 410 and fourth region 412, respectively.

2. Alternative Implementation(s) of Advertisement Placement Module

Figure 8:
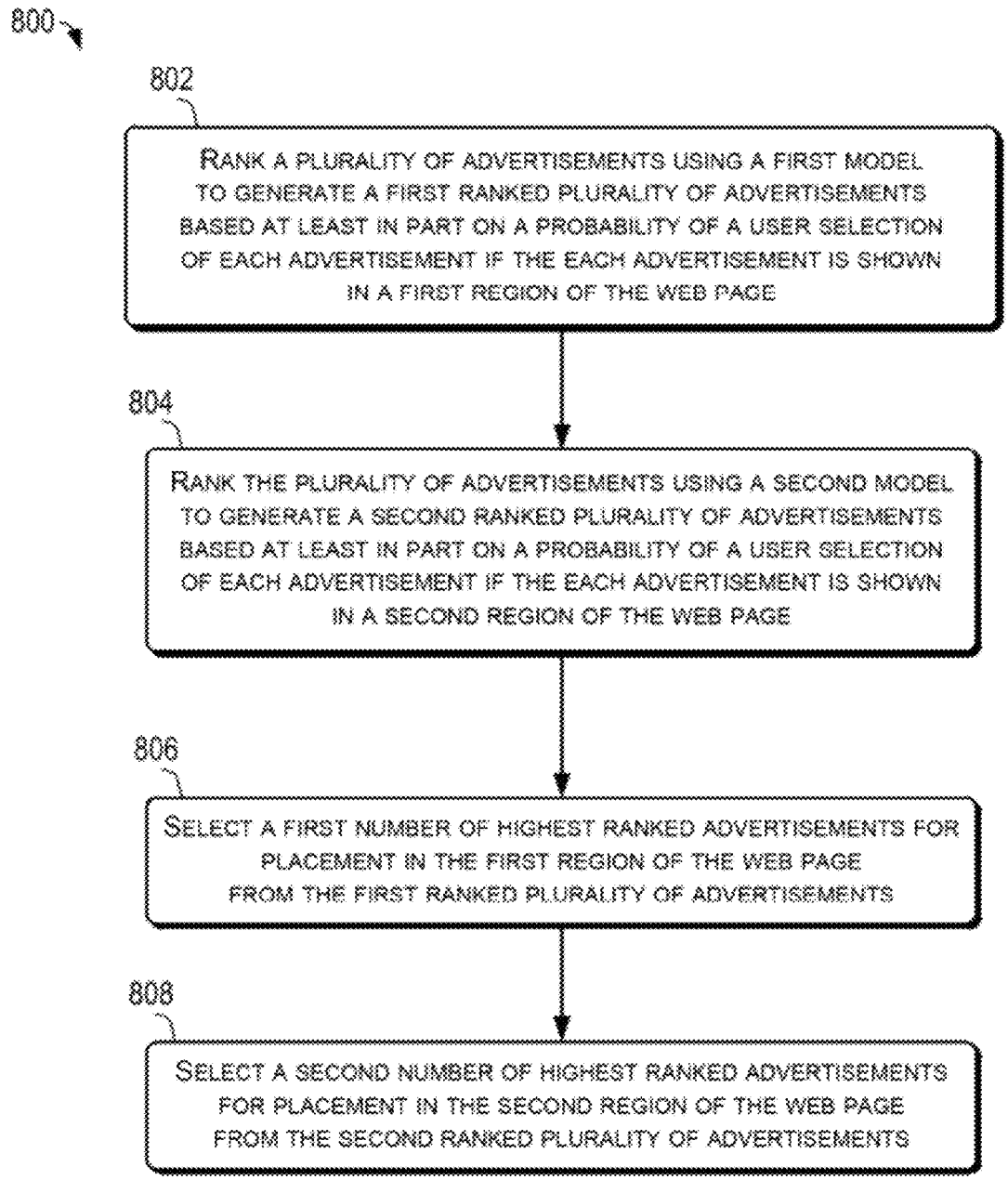
FIG. 8 depicts a flowchart of an alternate method for determining placement of a plurality of advertisements on a web page in accordance with an embodiment described herein.

FIG. 8 depicts a flowchart 800 of an alternate method for determining placement of a plurality of advertisements on a web page in accordance with an embodiment described herein. The method of flowchart 800 will be described in reference to elements of system 100. However, it is noted that the method is not limited to that implementation. Also, the method of flowchart 800 may be modified by those skilled in the art in order to derive additional alternative embodiment(s). Also, the steps may occur in a different order than shown, some steps may be performed concurrently, some steps may be combined with other steps, and/or some steps may be absent, as desired.

As shown in FIG. 8, the method of flowchart 800 begins at step 802 in which advertisement placement module 118 ranks a plurality of advertisements (also referred to as "ads") using a first model to generate a first ranked plurality of ads based at least in part on a probability of a user selection of each advertisement (also referred to as an "ad") of the plurality of ads if each ad is shown in first region of the web page 406. The plurality of ads may be ranked according to a ranking score that includes the probability of a user selection of each ad from the plurality of ads if that ad is shown in first region 406. Thus, if the web page includes additional regions, such as second and third regions 408 and 410, in step 802 advertisement placement module 118 may rank the plurality of ads by calculating a ranking score indicative of expected revenue from placing each ad in first region 406, but not in second and/or third regions 408 and 410.

In step 804 advertisement placement module 118 ranks the plurality of ads using a second model to generate a second ranked plurality of advertisements based at least in part on a probability of a user selection of each remaining ad of the plurality of ads if the each remaining ad is shown in second region 408. Thus, advertisement placement module 118 re-ranks the plurality of ads using a second model without removing any ads that may selected for placement in first region 406. The plurality of ads may be ranked according to a ranking score that includes the probability of a user selection of each ad from the plurality of ads if that ad is shown in second region 408. Thus, in step 804 advertisement placement module 118 may rank the plurality of ads by calculating a ranking score indicative of an expected revenue from placing each ad in second region 408, but not first region 406 (and any other region(s) if present).

In step 806 advertisement placement module 118 selects a first number of highest ranked advertisements for placement in first region 406 from the first ranked plurality of advertisements. For example, advertisement placement module 118 may select the top three ads from the first ranked plurality of advertisements that were ranked for first region 406 for placement in first region 406. In one example embodiment, advertisement placement module 118 may select up to a pre-determined number of ads from the first ranked plurality of advertisements ranked for first region 406 that have a ranking score greater than a threshold. For example, advertisement placement module 118 may only select one ad (i.e., the highest ranked ad) from the first ranked plurality of advertisements ranked for first region 406 if only the highest ranked ad has a ranking score that is higher than the threshold. In another example, advertisement placement module 118 may select three ads (i.e., the highest three ranked ads) from the first ranked plurality of advertisements ranked for first region 406 if the highest five ranked ads have a ranking score that is higher than the threshold and the pre-determined number of ads that can be shown at one time in first region 406 is three.

In step 808 advertisement placement module 118 selects a second number of highest ranked advertisements for placement in second region 408 from the second ranked plurality of advertisements. For example, advertisement placement module 118 may select the top three ads from the second ranked plurality of advertisements that were ranked for second region 408 for placement in second region 408. In one example embodiment, if an ad is selected in step 806, then it is unavailable for selection in step 808. For example, the same ad may be selected to be in the first number of highest ranked advertisements for placement in first region 406 as well as selected to be in the second number of highest ranked advertisements for placement in second region 408. In this example, the ad may be made unavailable for selection in the second number of highest ranked advertisements, and a next highest ranked ad may be selected instead of the duplicative ad. For example, if an ad is selected as a second highest ranked ad in the first number of highest ranked advertisements, and then the same ad is selected as a highest ranked ad in the second number of highest ranked advertisements, then this ad would not be used in the second number of highest ranked advertisements. Instead, a next ad, i.e., the second highest ranked ad from the second ranked plurality of advertisements, would be used instead as the highest ranked ad in the second number of highest ranked advertisements.

In one example embodiment, advertisement placement module 118 may select up to a pre-determined number of ads from the second ranked plurality of advertisements ranked for second region 408 that have a ranking score greater than a threshold. For example, advertisement placement module 118 may only select one ad (i.e., the highest ranked ad) from the second ranked plurality of ads ranked for second region 408 if only the highest ranked ad has a ranking score that is higher than the threshold. In another example, advertisement placement module 118 may select three ads (i.e., the highest three ranked ads) from the second ranked plurality of ads ranked for second region 408 if the highest five ranked ads have a ranking score that is higher than the threshold and the pre-determined number of ads that can be shown at one time in second region 408 is three. In one implementation, the threshold used in step 808 is the same as the threshold used in step 806. In another implementation, the threshold used in step 808 is different from the threshold used in step 806.

Figure 9:
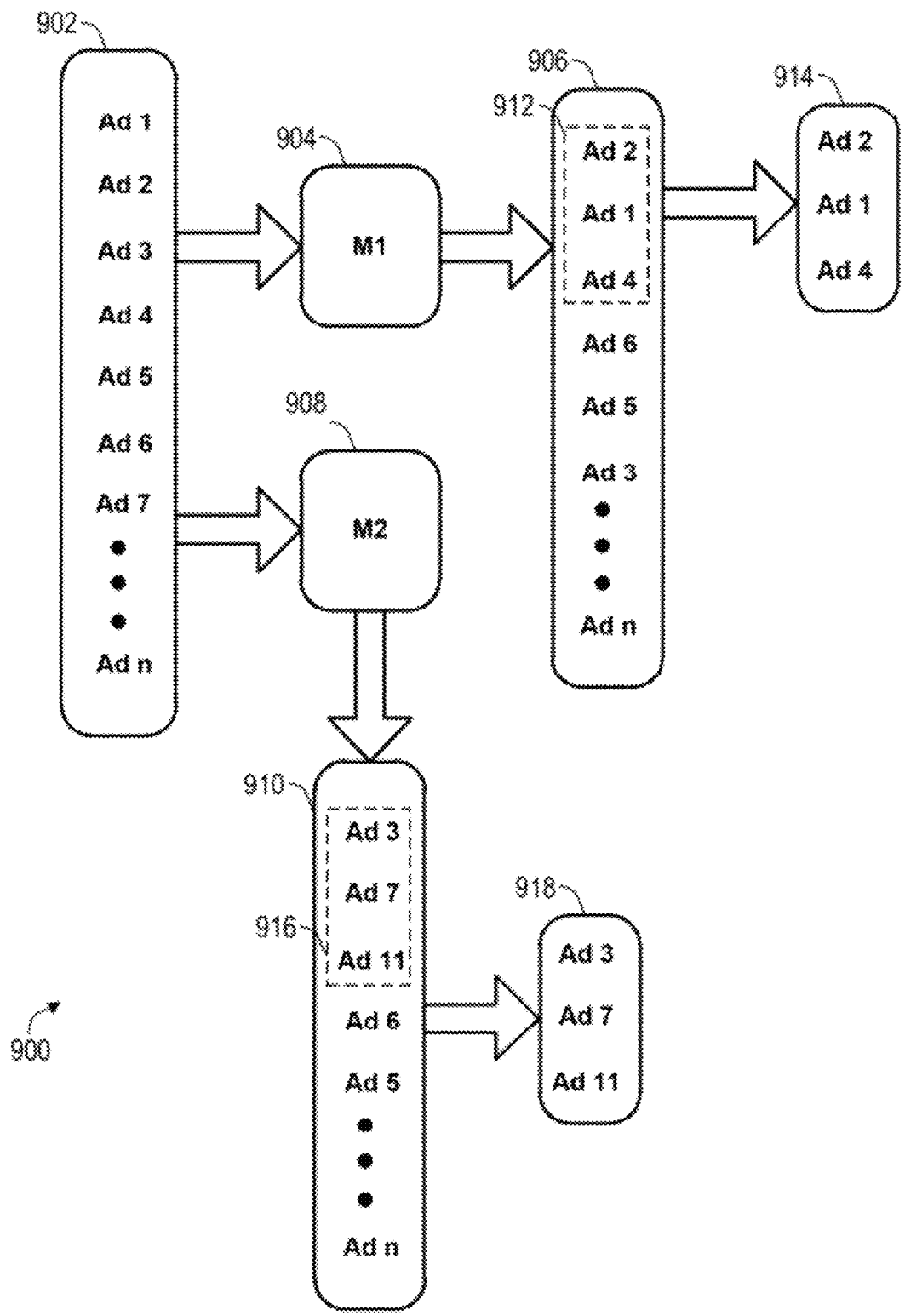
FIG. 9 shows an example implementation of advertisement placement module shown in FIG. 1 in accordance with an alternate embodiment described herein.

FIG. 9 shows an example implementation 900 of advertisement placement module 118 shown in FIG. 1 in accordance with an alternate embodiment described herein. FIG. 9 illustrates that advertisement placement module 900 operates on a plurality of ads 902 that includes ads 1-7, . . . , n, such as received from ad server 116. Advertisement placement module 900 uses a first model 904 to generate a first ranked plurality of advertisements 906 based at least in part on a probability of a user selection of each advertisement of plurality of advertisements 902 if each advertisement is shown in first region 406.

Advertisement placement module 900 ranks the plurality of advertisements 902 using a second model 908 to generate a second ranked plurality of advertisements 910 based at least in part on a probability of a user selection of each advertisement of the plurality of advertisements 902 if each advertisement is shown in second region 408. Thus, as shown in FIG. 9, advertisement placement module 900 may be configured to use first model 904 and second model 908 in parallel. Advertisement placement module 900 may calculate a ranking score for each ad in plurality of ads 902, such as by using a bid for each ad, prior to or during ranking the plurality of ads using either first or second model 904 and 908.

Advertisement placement module 900 selects a first number of highest ranked advertisements 912 for placement in first region of the web page 406 from first ranked plurality of advertisements 906. As described above, in one example advertisement placement module 900 may select up to a pre-determined number of ads, such as up to three ads 912, from first ranked plurality of ads 906, that have ranking scores higher than a threshold. It is noted that in other embodiments, placement module 900 may select up to a pre-determined number of ads from first ranked plurality of ads 906 that have ranking scores higher than or equal to the threshold. In the example shown in FIG. 9, advertisement placement module 900 may select three ads 914 including ads 2, 1, and 4 for placement in first region 406.

Advertisement placement module 900 selects a second number of highest ranked advertisements 916 for placement in second region of the web page 408 from second ranked plurality of advertisements 910. As described above, in one example advertisement placement module 900 may select up to a pre-determined number of ads, such as up to three ads 916, from second ranked plurality of ads 910 that have ranking scores higher than a threshold. It is noted that in other embodiments, placement module 900 may select up to a pre-determined number of ads from second ranked plurality of ads 910 that have ranking scores higher than or equal to the threshold. Advertisement placement module 900 may use three selected ads 916 for placement in second region 408. In the example shown in FIG. 9, advertisement placement module 900 selects three ads 918 including ads 3, 7, and 11 for placement in second region 408.

In one example embodiment, if an ad is selected in first number of highest ranked advertisements 912 for placement in first region 406, that ad is made unavailable for selection by advertisement placement module 900 to be in second number of highest ranked advertisements 916. For example, if ad 1 is selected as one of ads in first number of highest ranked advertisements 912, then ad 1 may be made unavailable for selection as part of second number of highest ranked advertisements 916. In this example, instead of using ad 1, a second highest ranked ad from second ranked plurality of advertisements 910 would be used instead as the highest ranked ad in second number of highest ranked advertisements 916. In another example embodiment, if an ad is selected in first number of highest ranked advertisements 912 for placement in first region 406, that ad may be removed from second ranked plurality of advertisements 910.

Figure 10:
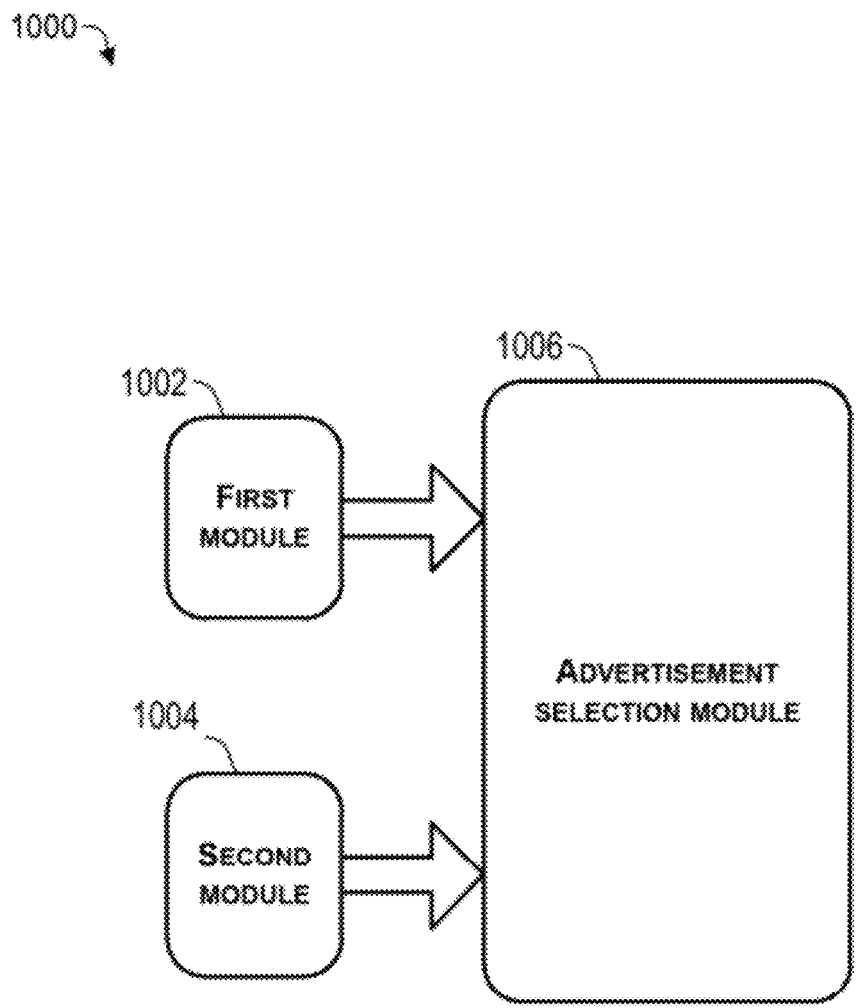
FIG. 10 shows another example implementation of advertisement placement module shown in FIG. 1 in accordance with an embodiment described herein.

FIG. 10 shows another example implementation 1000 of advertisement placement module 118 shown in FIG. 1 in accordance with an embodiment described herein. FIG. 10 illustrates that advertisement placement module 1000 includes a first module 1002, a second module 1004, and an advertisement selection module 1006.

First module 1002 is configured to calculate a probability of a user selection of each first advertisement of a plurality of first advertisements if the each first advertisement is shown in first region of the web page 406. For example, first module 1002 may calculate probability of a user selection of each ad of plurality of first advertisements 702 if each ad is shown in first region 406. In another example, first module 1002 may calculate probability of a user selection of each ad of plurality of first advertisements 902 if each ad is shown in first region 406.

Second module 1004 is configured to calculate a probability of a user selection of each second advertisement of a plurality of second advertisements if the each second advertisement is shown in second region of the web page 408. For example, second module 1004 may calculate probability of a user selection of each ad of plurality of second advertisements 710 if each ad is shown in second region 408. In another example, first module 1002 may calculate probability of a user selection of each ad of plurality of second advertisements 910 if each ad is shown in second region 408.

Advertisement selection module 1006 is coupled to first module 1002 and second module 1004. Advertisement selection module 1006 is configured to rank the plurality of first advertisements based at least on the probability of the user selection of the each first advertisement of the plurality of first advertisements and generate a ranked plurality of first advertisements. For example, advertisement selection module 1006 is configured to rank the plurality of ads 702 based at least on the probability of the user selection of each ad of plurality of ads 702 and generate ranked plurality of first advertisements 706. In another example, advertisement selection module 1006 is configured to rank plurality of ads 902 based at least on the probability of the user selection of each ad of plurality of ads 902 and generate ranked plurality of first advertisements 906. As noted elsewhere, advertising placement module 1006 may rank the plurality of ads based on the user click probability and a bid for each ad.

Advertisement selection module 1006 is configured to select a first number of highest ranked advertisements for placement in first region of the web page 406 from the ranked plurality of first advertisements. For example, advertisement selection module 1006 may select three highest ranked ads 708 from ranked plurality of first ads 706 for placement in first region 406. In another example, advertisement selection module 1006 may select three highest ranked ads 912 from ranked plurality of first ads 906 for placement in first region 406.

Advertisement selection module 1006 is configured to rank plurality of second advertisements based at least on the probability of the user selection of the each second advertisement of the plurality of second advertisements and generate a ranked plurality of second advertisements. For example, advertisement selection module 1006 is configured to rank the plurality of second ads 706 based at least on the probability of the user selection of each ad of plurality of second ads 706 and generate ranked plurality of second advertisements 716. In another example, advertisement selection module 1006 is configured to rank the plurality of ads 902 based at least on the probability of the user selection of each ad of plurality of ads 902 and generate ranked plurality of second ads 910. As noted elsewhere, advertising placement module 1006 may rank the plurality of ads based on the user click probability and a bid for each ad.

Advertisement selection module 1006 is configured to select a second number of highest ranked advertisements for placement in second region of the web page 408 from the ranked plurality of second advertisements. For example, advertisement selection module 1006 may select three highest ranked ads 718 from ranked plurality of second ads 716 for placement in second region 408. In another example, advertisement selection module 1006 may select three highest ranked ads 916 from ranked plurality of second ads 910 for placement in second region 408.

In some embodiments, advertisement placement module 118 may be configured to determine placement of various types of ads on web pages, i.e., each model may be used for a different type of an advertisement. For example, advertisement placement module 118 may use a first model to rank a plurality of banner advertisements, such as based at least in part on a probability of a user selection of each banner advertisement of the plurality of banner advertisements if the each banner advertisement is shown in a first region of the web page. In accordance with these embodiments, advertisement placement module 118 may use a second model to rank a plurality of sponsored search advertisements, such as based at least in part on a probability of a user selection of each sponsored search advertisement of the plurality of sponsored search advertisements if the each sponsored search advertisement is shown in a second region of the web page. In some embodiments, advertisement placement module 118 may be configured to determine placement of another ad type on web pages, such as banner advertisements only.

However, the invention is not limited to such embodiments, and other means for determining placement of advertisements on web pages may be used.

C. Example Computer System Implementations

Figure 11:
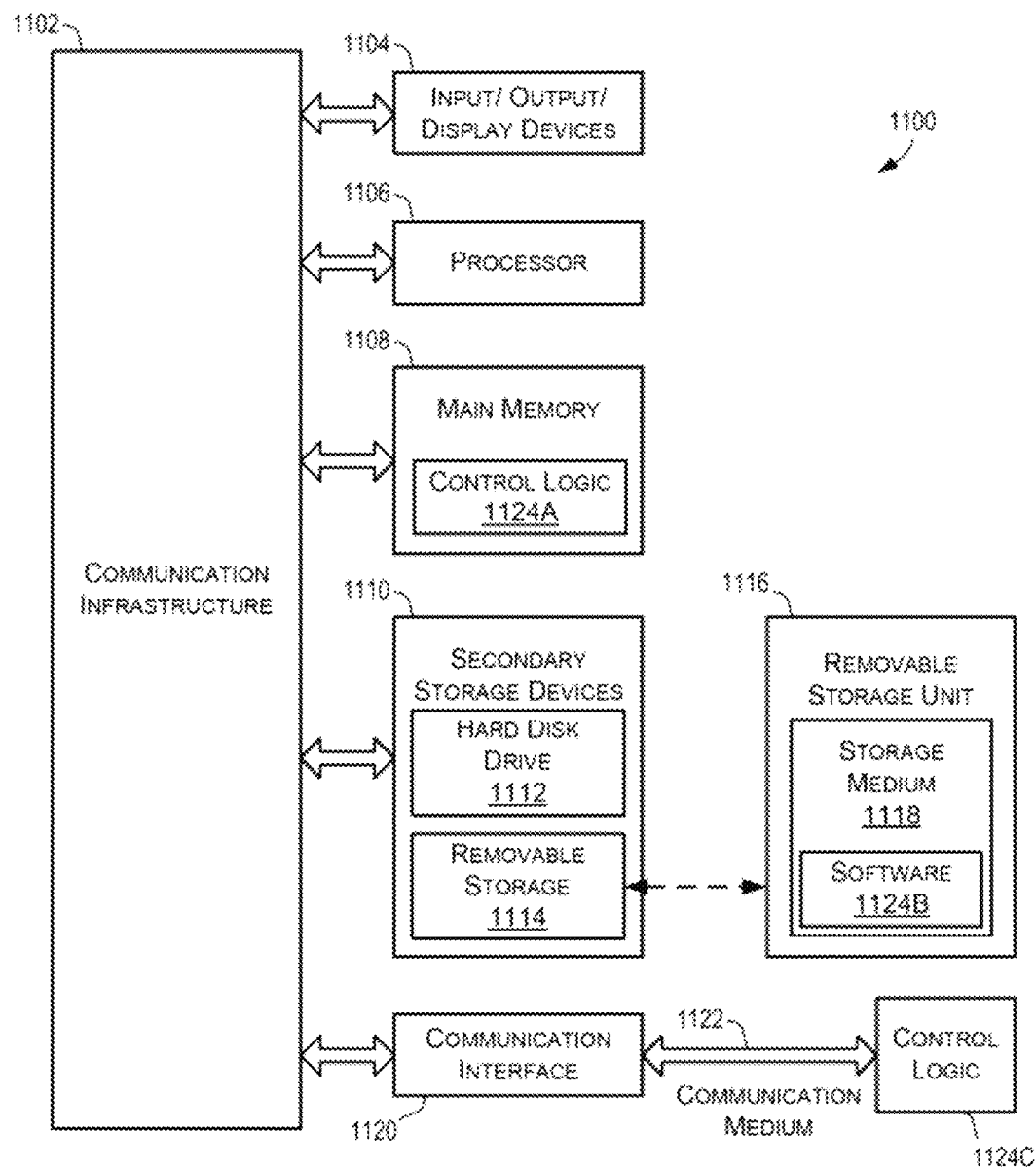
FIG. 11 is a block diagram of an example computer system that may be used to implement embodiments described herein.

The embodiments described herein, including systems, methods/processes, and/or apparatuses, may be implemented using well known servers/computers, such as computer 1100 shown in FIG. 11. For example, search engine 106 and research advertisement placement module 118 of FIG. 1, and the method described in the flowcharts depicted in FIGS. 3 and 8 can be implemented using one or more computers 1100.

Computer 1100 can be any commercially available and well known computer capable of performing the functions described herein, such as computers available from International Business Machines, Apple, Sun, HP, Dell, Cray, etc. Computer 800 may be any type of computer, including a desktop computer, a server, etc.

Computer 1100 includes input/output/display devices 1104, such as monitors, keyboards, pointing devices, etc.

Computer 1100 includes one or more processors (also called central processing units, or CPUs), such as a processor 1106. Processor 1106 is connected to a communication infrastructure 1102, such as a communication bus. In some embodiments, processor 1106 can simultaneously operate multiple computing threads.

Computer 1100 also includes a primary or main memory 1108, such as random access memory (RAM). Main memory 1108 has stored therein control logic 1124A (computer software), and data.

Computer 1100 also includes one or more secondary storage devices 1110. Secondary storage devices 1110 include, for example, a hard disk drive 1112 and/or a removable storage device or drive 1114, as well as other types of storage devices, such as memory cards and memory sticks. For instance, computer 1100 may include an industry standard interface, such a universal serial bus (USB) interface for interfacing with devices such as a memory stick. Removable storage drive 1114 represents a floppy disk drive, a magnetic tape drive, a compact disk drive, an optical storage device, tape backup, etc.

Removable storage drive 1114 interacts with a removable storage unit 1116. Removable storage unit 1116 includes a computer useable or readable storage medium 1118 having stored therein computer software 1124B (control logic) and/or data. Removable storage unit 1116 represents a floppy disk, magnetic tape, compact disk, DVD, optical storage disk, or any other computer data storage device. Removable storage drive 1114 reads from and/or writes to removable storage unit 1116 in a well known manner.

Computer 1100 further includes a communication or network interface 1120. Communication interface 1120 enables computer 1100 to communicate with remote systems and devices. For example, communication interface 1120 allows computer 1100 to communicate over communication networks or mediums 1122, such as LANs, WANs, the Internet, etc. Network interface 1120 may interface with remote sites or networks via wired or wireless connections.

Control logic 1124C may be transmitted to and from computer 1100 via the communication medium 1122. More particularly, computer 1100 may receive and transmit carrier waves (electromagnetic signals) modulated with control logic 1124C via communication medium 1122.

Any apparatus or manufacture comprising a computer useable or readable medium having control logic (software) stored therein is referred to herein as a computer program product or program storage device. This includes, but is not limited to, computer 1100, main memory 1108, secondary storage devices 1110, and removable storage unit 1116. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

D. Conclusion

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer-implemented method for determining placement of a plurality of advertisements on a web page, the method executable by a computer having a processor and memory, the method comprising:
    ranking, using the processor to execute first logic, the plurality of advertisements using a first model to generate a ranked plurality of advertisements based at least in part on a probability of a user selection of respective advertisement of the plurality of advertisements when shown in a first region of the web page;
    selecting, using the processor, a first number of highest ranked advertisements for placement in the first region of the web page from the ranked plurality of advertisements;
    delivering, using the processor, the first number of highest ranked advertisements to the first region of the web page;
    ranking, using the processor to execute second logic, remaining advertisements of the plurality of advertisements using a second model to generate a ranked plurality of remaining advertisements based at least in part on a probability of a user selection of respective remaining advertisement of the plurality of advertisements when shown in a second region of the web page; and
    selecting, using the processor, a second number of highest ranked advertisements for placement in the second region of the web page from the ranked plurality of remaining advertisements; and
    delivering, using the processor, the second number of highest ranked advertisements to the second region of the web page.

2. The method of claim 1, wherein said ranking the plurality of advertisements using a first model to generate a ranked plurality of advertisements comprises ranking the plurality of advertisements based at least in part on similarities between a query submitted by the user to a search engine and text of respective advertisement.

3. The method of claim 1, wherein said ranking remaining advertisements of the plurality of advertisements using a second model to generate a ranked plurality of remaining advertisements comprises ranking remaining advertisements of the plurality of advertisements based at least in part on similarities between a query submitted by the user to a search engine and text of respective advertisement of the plurality of advertisements.

4. The method of claim 1, wherein said selecting a first number of advertisements for placement in the first region of the web page from the ranked plurality of advertisements comprises:
    removing the first number of advertisements from the plurality of advertisements to generate the remaining advertisements of the plurality of advertisements.

5. The method of claim 1,
    wherein the first logic is configured to analyze one or more first features related to one or more of user characteristics, a user query, the plurality of advertisements, or a region of the web page to calculate the probability of user selection of respective advertisement when shown in the first region of the web page; and
    wherein said ranking the plurality of advertisements is further based on a bid for each advertisement, wherein the bid is indicative of an advertising revenue related to user selection of each advertisement.

6. The method of claim 5, further comprising:
    training the first model prior to performing the calculation of the probability of the user selection of each advertisement, wherein said training operates to train the first model to identify the one or more first features related to the one or more of the user characteristics, a user query, the plurality of advertisements, or a region of the web page that are indicative of the user selection of respective advertisement when shown in the first region of the web page.

7. The method of claim 1,
    wherein the second model analyzes one or more second features related to the one or more of the user characteristics, a user query, the plurality of advertisements, or a region of the web page to calculate the probability of the user selection of each remaining advertisement in the plurality of advertisements when shown in the second region of the web page; and
    wherein said ranking the remaining advertisements is further based on a bid for each remaining advertisement, wherein the bid is indicative of an advertising revenue related to user selection of each remaining advertisement.

8. The method of claim 7, further comprising:
    training the second model prior to performing the calculation of the probability of the user selection of each remaining advertisement, wherein said training operates to train the second model to identify the one or more second features related to the one or more of the user characteristics, a user query, the plurality of advertisements, or a region of the web page that are indicative of the user selection of each respective remaining advertisement when shown in the second region of the web page.

9. A system for determining placement of a plurality of advertisements on a web page, the system comprising:
a processor configured to execute first logic to calculate a probability of a user selection of respective first advertisement of a plurality of first advertisements when shown in a first region of the web page;
the processor further configured to execute second logic to calculate a probability of a user selection of respective second advertisement of a plurality of second advertisements when shown in a second region of the web page; and
the processor further configured to execute advertisement selection logic to:
rank the plurality of first advertisements based at least on the probability of the user selection of respective first advertisement of the plurality of first advertisements and generate a ranked plurality of first advertisements;
select a first number of highest ranked advertisements for placement in the first region of the web page from the ranked plurality of first advertisements;
rank the plurality of second advertisements based at least on the probability of the user selection of respective second advertisement of the plurality of second advertisements and generate a ranked plurality of second advertisements; and
select a second number of highest ranked advertisements for placement in the second region of the web page from the ranked plurality of second advertisements.

10. The system of claim 9, wherein the advertisement selection logic is configured to rank the plurality of first advertisements based at least in part on similarities between a query submitted by the user to a search engine and text of each advertisement of the plurality of advertisements.

11. The system of claim 9, wherein the advertisement selection logic is configured to rank the plurality of second advertisements based at least in part on similarities between a query submitted by the user to a search engine and text of respective advertisement of the plurality of advertisements.

12. The system of claim 9, wherein the advertisement selection logic is configured to remove the first number of advertisements from the ranked plurality of first advertisements to generate the plurality of second advertisements.

13. The system of claim 9,
wherein the first logic is further configured to analyze one or more features related to one or more of user characteristics, a user query, the plurality of advertisements, or a region of the web page to calculate the probability of the user selection of each first advertisement in the plurality of first advertisements when shown in the first region of the web page; and
wherein the advertisement selection logic is configured to rank the plurality of first advertisements further based on a bid for respective first advertisement, wherein the bid is indicative of an advertising revenue related to user selection of respective first advertisement in the first region of the web page.

14. The system of claim 13,
wherein the first logic is configured to be trained prior to performing the calculation of the probability of the user selection of each first advertisement;
wherein the first logic is configured to be trained to identify the one or more features related to the one or more of the user characteristics, a user query, the plurality of advertisements, or a region of the web page that are indicative of the user selection of respective first advertisement when respective first advertisement is shown in the first region of the web page.

15. The system of claim 13,
wherein the second logic is further configured to analyze one or more features related to one or more of user characteristics, a user query, the plurality of advertisements, or a region of the web page to calculate the probability of the user selection of respective second advertisement in the plurality of second advertisements when respective second advertisement is shown in the second region of the web page; and
wherein the advertisement selection logic is configured to rank the plurality of second advertisements further based on a bid for respective second advertisement, wherein the bid is indicative of an advertising revenue related to user selection of respective second advertisement in the second region of the web page.

16. The system of claim 15,
wherein the second logic is configured to be trained prior to performing the calculation of the probability of the user selection of respective second advertisement;
wherein the second logic is configured to be trained to identify the one or more features related to the one or more of: the user characteristics, a user query, the plurality of advertisements, or a region of the web page that are indicative of the user selection of each second advertisement when respective second advertisement is shown in the second region of the web page.

17. A non-transitory computer-readable storage medium having computer program logic recorded thereon for determining placement of a plurality of advertisements on a web page, the computer program logic executable by a processor and comprising:
instructions to direct the processor to rank the plurality of advertisements using a first model to generate a ranked plurality of advertisements based at least in part on a probability of a user selection of respective advertisement of the plurality of advertisements when shown in a first region of the web page;
instructions to direct the processor to select a first number of highest ranked advertisements for placement in the first region of the web page from the ranked plurality of advertisements;
instructions to direct the processor to deliver the first number of highest ranked advertisements to the first region of the web page;
instructions to direct the processor to rank remaining advertisements of the plurality of advertisements using a second model to generate a ranked plurality of remaining advertisements based at least in part on a probability of a user selection of respective remaining advertisement of the plurality of advertisements when shown in a second region of the web page;
instructions to direct the processor to select a second number of highest ranked advertisements for placement in the second region of the web page from the ranked plurality of remaining advertisements; and instructions to direct the processor to deliver the second number of highest ranked advertisements to the second region of the web page.

18. The computer-readable storage medium of claim 17, further comprising:
instructions to direct the processor to rank the plurality of advertisements based at least in part on similarities between a query submitted by the user to a search engine and text of each advertisement of the plurality of advertisements.

19. The computer-readable storage medium of claim 18, further comprising:
instructions to direct the processor to rank remaining advertisements of the plurality of advertisements based at least in part on similarities between a query submitted by the user to a search engine and text of each advertisement of the plurality of advertisements.

20. The computer-readable storage medium of claim 18, further comprising:
instructions to direct the processor to remove the first number of advertisements from the plurality of advertisements to generate the remaining advertisements of the plurality of advertisements.

21. The computer-readable storage medium of claim 18, further comprising:
instructions to direct the processor to use the first model to analyze one or more first features related to one or more of user characteristics, a user query, the plurality of advertisements, or a region of the web page to calculate the probability of the user selection of respective advertisement in the plurality of advertisements when shown in the first region of the web page; and
instructions to direct the processor to rank the plurality of advertisements based on a bid for the respective advertisement, wherein the bid is indicative of an advertising revenue related to user selection of the respective advertisement.

22. The computer-readable storage medium of claim 21, further comprising:
instructions to direct the processor to train the first model prior to performing the calculation of the probability of the user selection of the respective advertisement, wherein said training operates to train the first model to identify the one or more first features related to the one or more of the user characteristics, a user query, the plurality of advertisements, or a region of the web page that are indicative of the user selection of each respective advertisement when shown in the first region of the web page.

23. The computer-readable storage medium of claim 21, further comprising:
instructions to direct the processor to use the second model to analyze one or more second features related to the one or more of the user characteristics, a user query, the plurality of advertisements, or a region of the web page to calculate the probability of the user selection of respective remaining advertisement in the plurality of advertisements when shown in the second region of the web page;
instructions to direct the processor to rank the remaining advertisements further based on a bid for each remaining advertisement, wherein the bid is indicative of an advertising revenue related to user selection of respective remaining advertisement.

24. The computer-readable storage medium of claim 23, further comprising:
instructions to direct the processor to train the second model prior to perform the calculation of the probability of the user selection of the respective remaining advertisement, wherein said training operates to train the second model to identify the one or more second features related to the one or more of the user characteristics, a user query, the plurality of advertisements, or a region of the web page that are indicative of the user selection of the respective remaining advertisement when shown in the second region of the web page.

25. A computer-implemented method for determining placement of a plurality of advertisements on a web page, the method executable by a computer have a processor and memory, the method comprising:
ranking, using the processor, the plurality of advertisements using a first model to generate a first ranked plurality of advertisements based at least in part on a probability of a user selection of respective advertisement of the plurality of advertisements when shown in a first region of a web page;
ranking, using the processor, the plurality of advertisements using a second model to generate a second ranked plurality of advertisements based at least in part on a probability of a user selection of each respective advertisement of the plurality of advertisements when shown in a second region of the web page;
selecting, using the processor, a first number of highest ranked advertisements for placement in the first region of the web page from the first ranked plurality of advertisements;
delivering, using the processor, the first number of highest ranked advertisements to the first region of the web page;
selecting, using the processor, a second number of highest ranked advertisements for placement in the second region of the web page from the second ranked plurality of advertisements; and
delivering, using the processor, the second number of highest ranked advertisements to the second region of the web page.

* * * * *